United States Patent
Sacks et al.

(10) Patent No.: US 7,502,627 B2
(45) Date of Patent: Mar. 10, 2009

(54) SYSTEM FOR PRODUCT SELECTION

(75) Inventors: Jerry Dennis Sacks, Houston, TX (US); James Michael Parks, Richmond, TX (US); Jeffrey Dean Altemus, Katy, TX (US)

(73) Assignee: Systems Application Engineering, Inc.

( * ) Notice: Subject to any disclaimer, the term of this patent is extended or adjusted under 35 U.S.C. 154(b) by 565 days.

(21) Appl. No.: 10/736,427

(22) Filed: Dec. 15, 2003

(65) Prior Publication Data

US 2004/0128200 A1 Jul. 1, 2004

Related U.S. Application Data

(60) Provisional application No. 60/436,116, filed on Dec. 23, 2002.

(51) Int. Cl.
*H04M 1/00* (2006.01)
(52) U.S. Cl. .................. 455/556.1; 455/66.1; 455/563; 455/556.2; 340/5.92
(58) Field of Classification Search ................ 455/66.1, 455/563, 556.2, 556.1
See application file for complete search history.

(56) References Cited

U.S. PATENT DOCUMENTS

| | | | |
|---|---|---|---|
| 5,274,560 A | | 12/1993 | LaRue |
| 5,873,070 A | * | 2/1999 | Bunte et al. .................. 705/28 |
| 2002/0017567 A1 | * | 2/2002 | Connolly et al. ........ 235/472.02 |
| 2003/0020629 A1 | * | 1/2003 | Swartz et al. .......... 340/825.25 |
| 2003/0101069 A1 | | 5/2003 | Sando |
| 2004/0054607 A1 | | 3/2004 | Waddington et al. |
| 2004/0117196 A1 | | 6/2004 | Brockman et al. |
| 2004/0118907 A1 | | 6/2004 | Rosenbaum et al. |

* cited by examiner

*Primary Examiner*—Charles N Appiah
*Assistant Examiner*—Randy Peaches
(74) *Attorney, Agent, or Firm*—Buskop Law Group; Wendy Buskop

(57) ABSTRACT

The invention is a system for product selection at a location with a wearable mobile computer with memory and a processor, a bar code reader in communication with the wearable mobile computer, a viewing and input component with a display screen and a tactile input device, an audio output device and audio input device, both in communication with the wearable mobile computer, text-to-speech software, voice recognition software, order filling applications software, a printer, and a radio frequency identification (RFID) reader in communication with the wearable mobile computer, wherein the mobile computer is further adapted to communicate between a user and an order systems server adapted to communicate between the wearable mobile computer and at least one external computer system.

21 Claims, 4 Drawing Sheets

SYSTEM FOR PRODUCT SELECTION

CROSS-REFERENCE TO RELATED APPLICATIONS

This application claims priority to copending U.S. Patent Application Ser. No. 60/436,116, filed Dec. 23, 2002, which is incorporated by reference herein.

FIELD OF THE INVENTION

The present invention relates to a system for product selection at a location.

BACKGROUND OF THE INVENTION

Current methods for selecting objects at warehouses are slow, and subject to error. Selectors or pickers who are responsible for gathering items in a warehouse tend to make mistakes in reading the orders, selecting the correct object, the correct quantity of objects or generally being too slow.

A need has existed to overcome the above problems, efficiently and economically.

SUMMARY OF THE INVENTION

The invention satisfies the needs in the prior art by providing a system for product selection at a location.

The invention is a wearable mobile computer with memory and a processor, a bar code reader, and a viewing and input component. The invention also has an audio output device and audio input device in communication with the wearable mobile computer, text-to-speech software, voice recognition software, order filling applications software, a printer and radio frequency identification (RFID) reader.

The wearable mobile computer is further adapted to facilitate communication between the order systems server and a user. The orders system server is, in turn, adapted for communication between the wearable mobile computer and at least one external computer system.

BRIEF DESCRIPTION OF THE DRAWINGS

The present invention will be explained in greater detail with reference to the appended figures, in which.

The present invention is detailed below with reference to the listed Figures.

DETAILED DESCRIPTION OF THE PREFERRED EMBODIMENTS

Before explaining the present invention in detail, it is to be understood that the invention is not limited to the particular embodiments and that it can be practiced or carried out in various ways.

Figure 1:
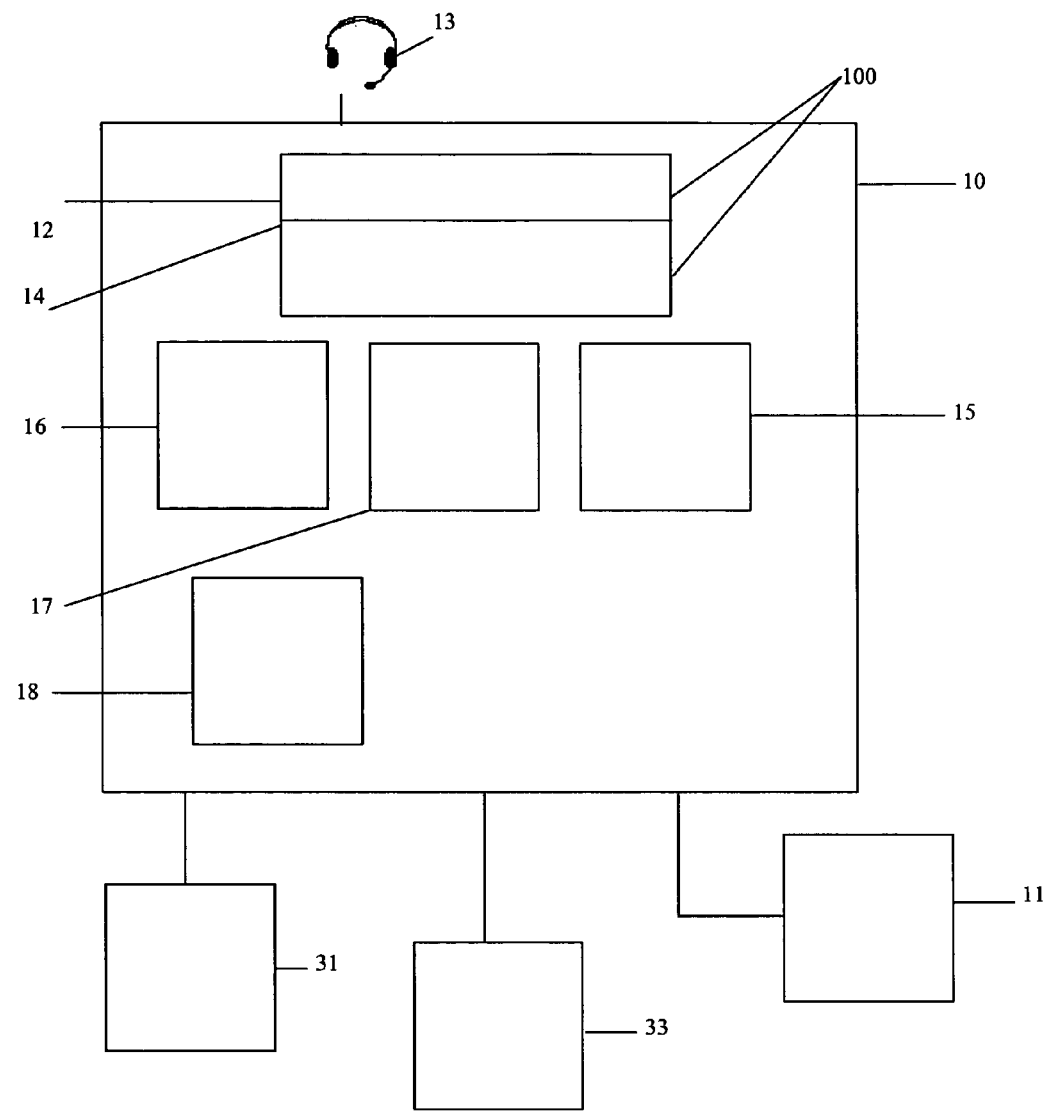
FIG. 1 is a diagram of the wearable mobile computer and accessories used in the inventive system.

The invention relates to a system for product selection at a location comprising: a wearable mobile computer (10) with memory and a processor, a bar code reader (11) in communication with the wearable mobile computer (10), a viewing and input component (100), an audio output device(13), and an audio input device (31) in communication with the wearable mobile computer, text-to-speech software (15), voice recognition software (16), applications software (17) residing in the memory; a printer (33) and a radio frequency identification (RFID) reader (18) in communication with the wearable mobile computer, and wherein the wearable mobile computer is further adapted for communication, as shown in FIG. 1.

A typical mobile computer usable within the scope of this invention would be a handheld computer, such as PDT8146-D4BA30WW or PDT8146-T4BA30WW available from Symbol Technologies. The barcode scanner can be a scanner that is part of the mobile computer or a wireless scanner, CRS-1-20000-00 or wireless Bluetooth ring scanner available from Symbol Technologies. A typical audio output device and audio input device could be a headset, such as the VR-3344 headset, single ear available from Knowles Acoustics. The mobile computer is preferably wearable, such as with a holder part no. 11-53814-01 also available from Symbol Technologies. The voice recognition software can be Speech2Go Software or Vocom 3200 both available from ScanSoft, Incorporated or Mobile Conversay M CSDK from Conversational Computing Corporation. The text-to-speech software can be Real Speak Solo Software from ScanSoft, Incorporated. The wireless communication radio is a Bluetooth connection kit consisting of the CompactFlash I/O Bluetooth Card, Type I provided by Socket Communications. The communication software that would enable the handheld computer to communicate with the host server in a wireless mode would be the Spectrum objects available form Symbol Technologies, Inc. Printers usable in this invention would be the wireless QL320 or QL420 Bluetooth Printer from Zebra Technologies, Inc.

The viewing and input component (100) consists of a member of the group: a display (12) integral with the wearable mobile computer and a tactile input device (14) in communication with the wearable mobile computer; a display screen (12) that is a touch screen in communication with the wearable mobile computer, and combinations thereof.

Figure 2:
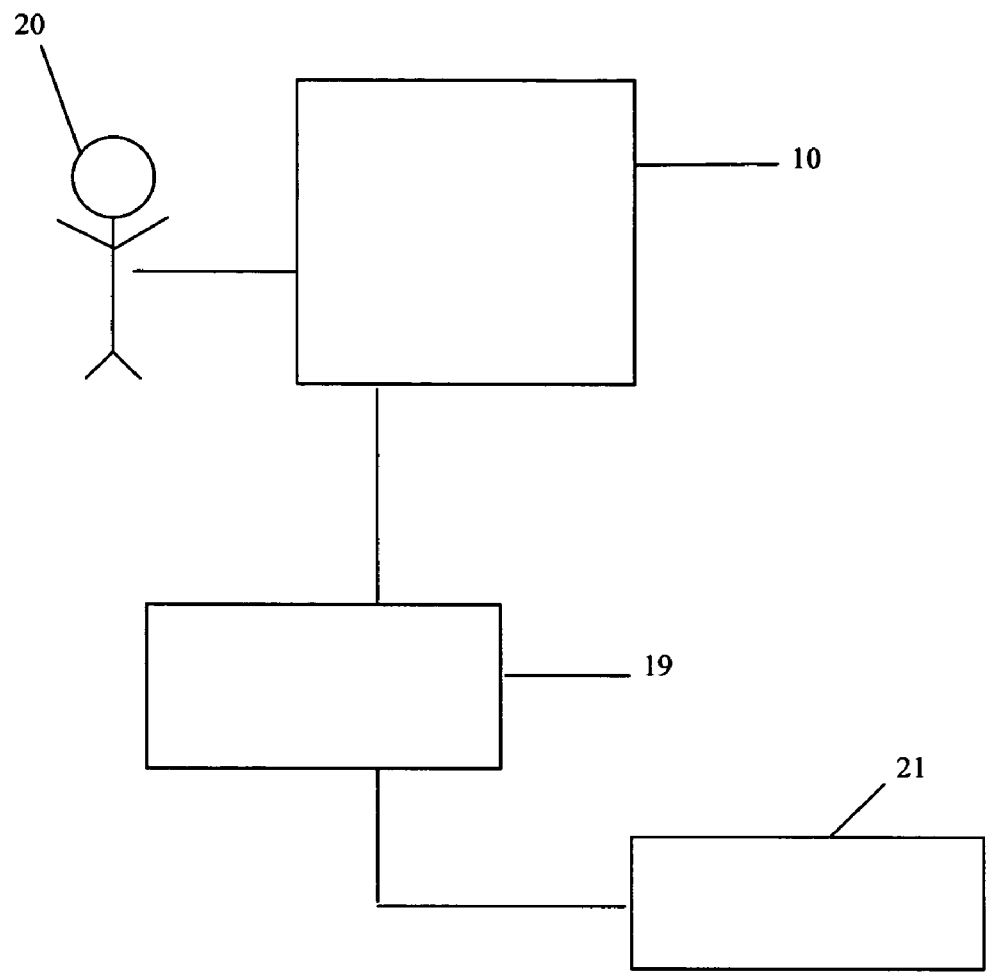
FIG. 2 is a diagram of the overall system for order selecting.

FIG. 2 shows a diagram of the overall system for order selecting, wherein the wearable mobile computer (10) is further adapted for communications between an order systems server (19), a user (20), and an order system that is adapted for communications between the wearable mobile computer (10) and at least one external computer system (21).

The wearable mobile computer can be selected from the group: a handheld computer, a PDA, or a notepad computer. The wearable mobile computer can be a PDT8146-D4BA30WW or PDT8146-T4BA30WW provided by Symbol Technologies, Inc. or a HP IPAQ Model 5555 provided by Hewlett Packard.

The display can be a member of the group: LCD display, a plasma display, a monochrome display, or a colored display.

Figure 3:
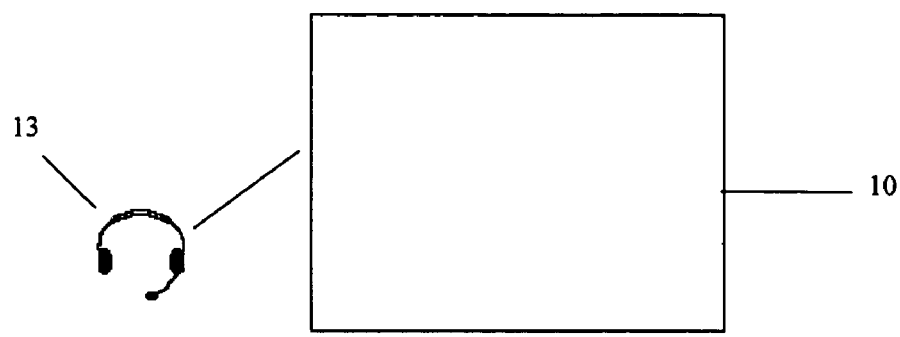
FIG. 3 is a top view of the wearable mobile computer with integral audio output device.

FIG. 3 shows a top view of the wearable mobile computer with an integral audio output device. The audio output device can be selected from the group: a speaker disposed integrally with the wearable mobile computer (10), a headset with at least one earphone, and an external speaker.

Figure 4:
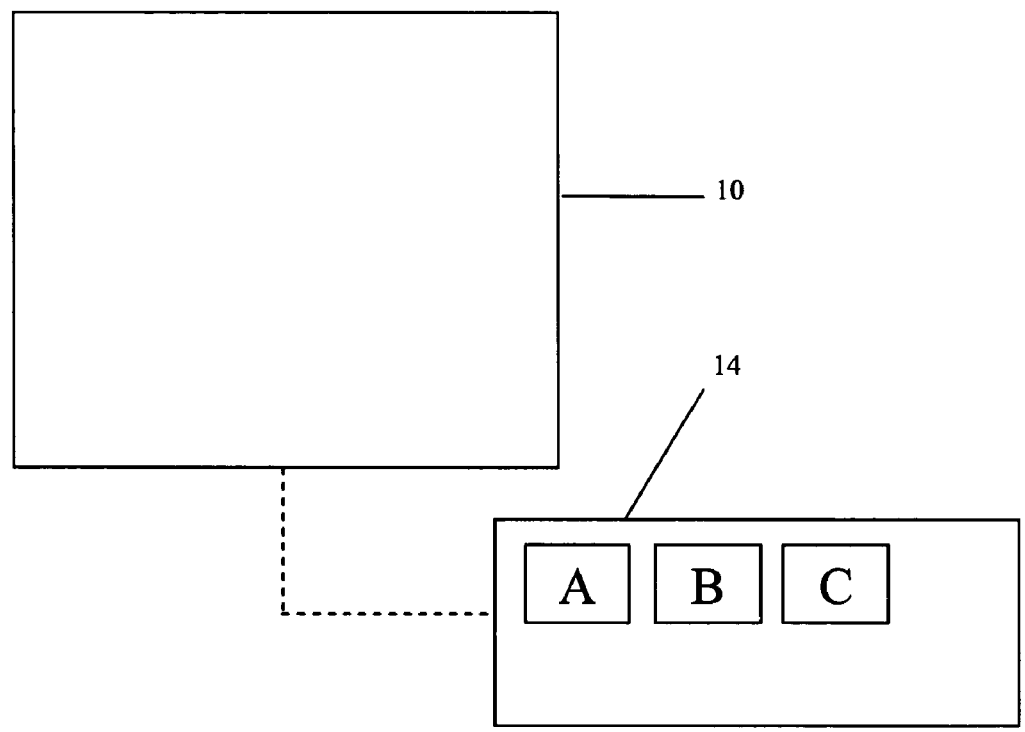
FIG. 4 is a view of the wearable mobile computer for use for order selecting with wireless tactile input device.

FIG. 4 is a view of the wearable mobile computer for order selecting with a tactile input device. In the present invention the tactile input device is a keyboard.

In the preferred embodiment three types of software are incorporated in the present invention. The text-to-speech software is adapted to convert text to an audio output. The voice recognition software is adapted to convert an audio signal to text. The order filling applications software is adapted to manage a process for selecting product (14).

Figure 5:
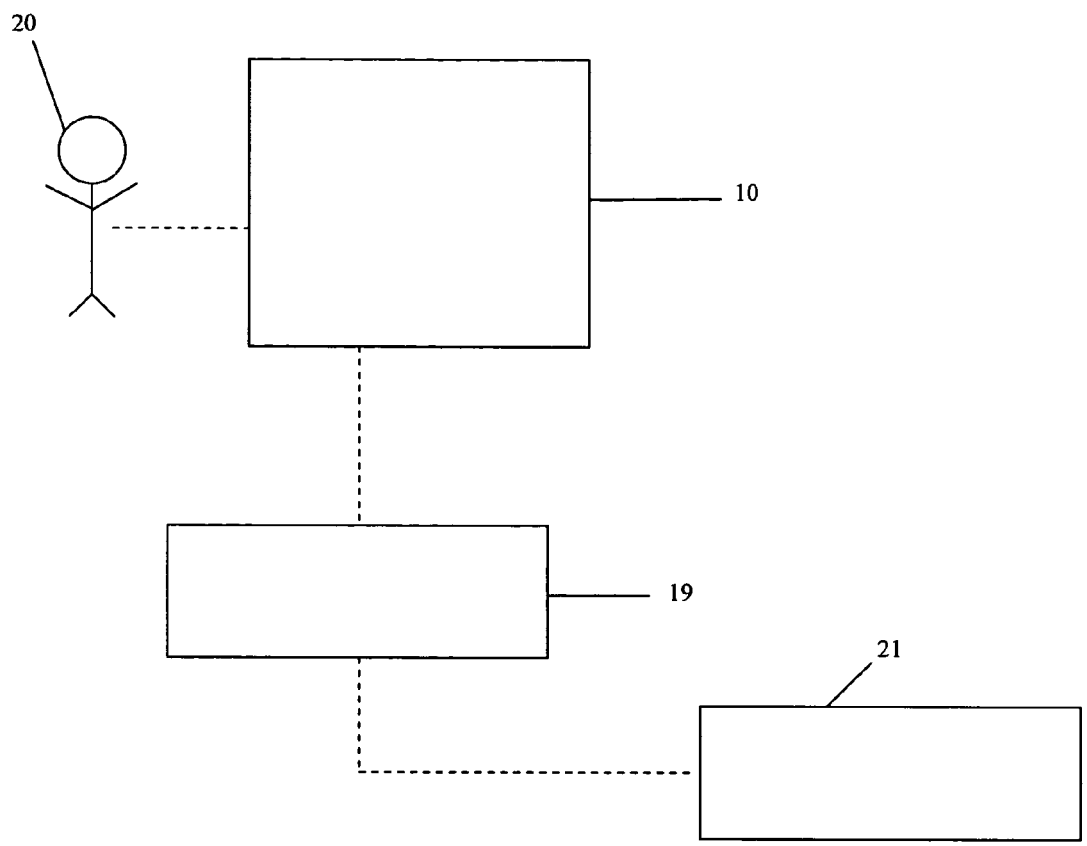
FIG. 5 is a representation of the wireless wearable mobile computer embodiment wherein the entire system is wireless.

The most preferred embodiment of the present invention, the bar code reader, audio output device, tactile input device, and order systems server, RFID reader, order systems server are wireless, and external computer system. FIG. 5 shows a representation of the wireless wearable mobile computer embodiment wherein the entire system is wireless.

The radio frequency identification (RFID) reader is in wireless communication with the wearable mobile computer, wherein the RFID reader is a wireless reader of radio frequency identification data (23). FIG. 5 shows a detailed representation of the wireless wearable mobile computer in wireless communication with a wireless RIFD and radio frequency identification data readable by the RIFD.

The order systems sever (19) can be selected from the group: a Personal Computer, a Unix-based™ server, an NT™ server, a Windows-based™ server, or a Linux-based server.

The invention has an external computer system that can be selected from the group: a Personal Computer, a Unix-based™ server, a NT™ server, a Windows-based™ server, or a Linux-based server. The external computer system can also be a member of the group: customer order system, a customer warehouse management system, a loader system server, an inventory control system, an orders delivery system server, and combinations thereof. As shown in FIG. 6, the external computer system is wirelessly connected to the order systems server in the preferred embodiment of the invention.

While this invention has been described with emphasis on the preferred embodiments, it should be understood that within the scope of the appended claims the invention might be practiced other than as specifically described herein.

What is claimed is:

1. A system for product selection at a location comprising:
   a. a wearable mobile computer with a memory and a processor
   b. a bar code reader in communication with the wearable mobile computer;
   c. a viewing and input component consisting of a member of the group:
      i. a display integral with the wearable mobile computer;
      ii. a tactile input device in communication with the wearable mobile computer;
      iii. a display screen that is a touch screen in communication with the wearable mobile computer; and
      iv. combinations thereof;
   d. an audio output device in communication with the wearable mobile computer;
   e. an audio input device in communications with the wearable mobile computer;
   f. text-to-speech software residing in the memory of the wearable mobile computer;
   g. a voice recognition software residing in the memory of the wearable mobile computer;
   h. order filling applications software residing in the memory of the wearable mobile computer adapted for communicating using the text-to-speech software with a user and receiving communications from the user using the voice recognition software;
   i. a printer in communications with the wearable mobile computer;
   j. radio frequency identification (RFID) reader in communication with the wearable mobile computer, and
   k. wherein the wearable mobile computer is farther adapted for directly communicating with a user and an order system server; and
   l. wherein the order systems server is adapted for communicating with at least one external computer system.

2. The system of claim 1, wherein the bar code reader is either wired or wireless.

3. The system of claim 1, wherein the wearable mobile computer is selected from the group: a handheld computer, a PDA, and a notepad computer.

4. The system of claim 1, wherein the display is a member of the group: LCD display, a plasma display, a monochrome display, and a colored display.

5. The system of claim 1, wherein the audio output device is a member of the group: a speaker disposed integrally with the wearable mobile computer, a headset with at least one earphone, and an external speaker.

6. The system of claim 1, wherein the audio output device is either wired or wireless.

7. The system of claim 1, wherein the tactile input device is either wired or wireless.

8. The system of claim 1, wherein the tactile input device is a keyboard.

9. The system of claim 1, wherein the text-to-speech software is adapted to convert text to an audio output.

10. The system of claim 1, wherein the voice recognition software is adapted to convert an audio signal to text.

11. The system of claim 1, wherein the order filling applications software is adapted to manage a process for selecting product.

12. The system of claim 1, wherein the radio frequency identification (RFID) reader is in wireless communication with the wearable mobile computer.

13. The system of claim 1, wherein the RFID reader is a wireless reader of radio frequency identification data.

14. The system of claim 1, wherein the order systems server is selected from the group: a Personal Computer, a UNIX-based™ server, an NT™ server, a WINDOWS-based™ server, and a LINUX-based server.

15. The system of claim 1, wherein the external computer system is selected from the group: a Personal Computer, a UNIX-based™ server, an NT™ server, a WINDOWS-based™ server, and a LINUX-based server.

16. The system of claim 1 wherein the audio input device is a microphone.

17. The system of claim 1, wherein the printer is in wired or wireless communications with the wearable mobile computer.

18. The system of claim 1, wherein the word product can mean an object, item, case, containing piece of equipment and any other item that can be selected.

19. The system of claim 15, wherein the external computer system is a member of the group: customer order system, a customer warehouse management system, a loader system server, an inventory control system and combinations thereof.

20. The system of claim 15, wherein the external computer is wirelessly connected to the order systems server.

21. The system of claim 14, wherein the order systems server is wireless.

* * * * *